United States Patent [19]

Oishi et al.

[11] Patent Number: 4,544,976
[45] Date of Patent: Oct. 1, 1985

[54] PAD PROVIDED IN THE INTERIOR OF A VIDEOTAPE CASSETTE

[75] Inventors: Kengo Oishi; Choji Komiyama; Osamu Suzuki, all of Odawara, Japan

[73] Assignee: Fuji Photo Film Co., Ltd., Japan

[21] Appl. No.: 447,300

[22] Filed: Dec. 6, 1982

[30] Foreign Application Priority Data

Dec. 15, 1981 [JP] Japan .......................... 56-186963[U]

[51] Int. Cl.[4] .............................................. G11B 15/60
[52] U.S. Cl. ............................... 360/132; 360/130.32; 360/130.33; 360/130.3; 242/199
[58] Field of Search .................... 360/131, 132, 130.2, 360/130.1, 130.21, 130.3, 130.31, 130.32, 130.33; 242/199, 198, 76

[56] References Cited

U.S. PATENT DOCUMENTS 3,499,998  3/1970  Tanigawa et al. ............. 360/130.21
3,642,229  2/1972  Downey et al. .................... 242/199
3,889,900  6/1975  Nelson ............................... 242/199
4,097,006  6/1978  Saito .................................... 242/76
4,363,042  12/1982 Kimura et al. ................. 360/130.21
4,466,582  8/1984  Shiba .................................. 242/199

FOREIGN PATENT DOCUMENTS 2027676  2/1980  United Kingdom ............... 360/132

Primary Examiner—Stuart N. Hecker
Assistant Examiner—Alfonso Garcia
Attorney, Agent, or Firm—Lucas & Just

[57] ABSTRACT

A pad which is to be provided in the interior of a videotape cassette according to this invention is in the form of a hollow cylinder. When fitted in place in the interior of a videotape cassette, the cylindrical pad is yieldingly deformed to produce a resilient force, thereby pushing a videotape against an associated guide stud. Because of the cylindrical shape, the pad requires no large space to mount, and accordingly a videotape cassette can be substantially reduced in size. The cylindrical pad need only be pushed into place in the interior of a cassette housing, and this easy mounting is advantageous to the mass-production of videotape cassettes.

6 Claims, 7 Drawing Figures

PAD PROVIDED IN THE INTERIOR OF A VIDEOTAPE CASSETTE

BACKGROUND OF THE INVENTION

1. Field of the Invention

This invention relates to a pad provided in a videotape cassette (hereinafter referred to simply as "pad"), and more particularly to a cylindrical pad equipped with a frictionless and wear-free member at a part of the pad which will contact a videotape when provided in the interior of a videotape cassette 2. Description of the Prior Art Videotape recorders for amateur use which are capable of recording and/or reproducing video and audio signals have been developed and put into mass-production. (The word, "videotape recording-and-reproducing apparatus" hereinafter used denotes a videotape recording-and-reproducing apparatus and an apparatus designed exclusively for recording or for reproducing only.) When videotape recording-and-reproducing apparatuses first appeared, open-reel type videotapes were commonly used. Disadvantageously, these videotapes are difficult to handle, and they require a relatively large space to mount in a videotape recording-and-reproducing apparatus. In an attempt to solve these and other problems which prevent reduction of the size of a videotape recording-and-reproducing apparatus, a lighter and smaller videotape cassette and a videotape recording-and-reproducing apparatus provided with facilities for mounting such videotape cassette were developed and manufactured.

As is well known, video signals are recorded or reproduced magnetically along a magnetic tape as the magnetic tape travels across a recording or reproducing head with a coating of powdered magnetic material of the tape in contact with the head. In the recording the videotape is magnetized in accordance with the video and audio signals impressed thereon, whereas in the reproducing the video and audio signals are magnetically retrieved in the form of electrical signals. As is well known, in the case of recording audio signals alone, it suffices that a recording tape is magnetized along its length in accordance with audio signals impressed thereon.

Video signals, however, contain much more information than audio signals, and, therefore, it is impractical for an ordinary recording tape to store video information if such information is stored as magnetic signals along the length of the tape. In an attempt to increase the density at which information is stored on an ordinary magnetic recording tape to the extent that the tape can record as much information as contained in video signals, the tape is magnetized obliquely to its length with the aid of a rotating multiple head which scans obliquely across the width of the tape at a speed greater than the normal travel speed of the tape in the longitudinal direction.

Any irregularity in speed or "jitter" in the longitudinal direction of travel of the tape will adversely affect the recording and reproducing of the video signals, so the quality of recorded or reproduced video signals depends on the stability of the longitudinal speed of a videotape.

Usually a videotape recording-and-reproducing apparatus is equipped with a servo control for maintaining a videotape at a constant speed in the longitudinal direction, thereby assuring that video signals are recorded and reproduced with high fidelity.

In abnormal running conditions, however, undesired external factors are liable to affect the travel of a videotape. In some instances sudden changes in tractive force arising from irregular movements of reels causes the moving videotape to deviate from its regular path of travel which is defined by guide members. As a result the videotape cannot maintain its travel at a given constant speed.

In an attempt to prevent a moving videotape from deviating from its regular path of travel under the influence of such undesirable forces acting on the videotape, a pad has been provided in the interior of the videotape cassette.

To allow a recording and/or reproducing head to get ready an access to and contact with a videotape which is contained in a videotape cassette, a part of the videotape extending between the pay-out and the take-up reels in the cassette is exposed to the exterior of the cassette. This arrangement requires providing a pad in the interior of a cassette for the purpose of preventing the videotape from becoming loose and coming out of the cassette when the cassette is not fitted in a videotape recording-and-reproducing apparatus.

FIG. 1 shows a perspective view of a part of a videotape cassette equipped with a conventional pad. As shown, the pad 10 consists of a base plate 1 and a substantially frictionless portion 2 applied to a free end of the base plate 1, which is adapted to contact with a videotape in the interior of the cassette. The other end of the base plate 1 is fixed to a stationary stand 8. With this arrangement the pad 10 pushes the videotape 5 against an associated guide stud 7.

FIG. 2A is a front view of a conventional pad, and FIG. 2B is a plane view of the pad of FIG. 2A.

As seen in these figures, the pad consists of a resilient base plate 1 and a substantially frictionless strip portion 2 affixed to one end of the base plate with a piece of adhesive tape 3.

In the arrangement seen in FIG. 1, and with reference to FIGS. 2A and 2B, the base plate 1 is fixed to a stationary stand 8 along an end 1a, and is yieldingly bent with its frictionless strip 2 pushing a videotape 5 against the guide surface of the guide stud 7. This arrangement naturally requires a substantial extension of the base plate in the dimension from end 1a to end 1b, and accordingly a conventional pad requires the provision of a relatively large space in the interior of a small-sized videotape cassette. Thus, provision of such a pad in the interior of a videotape cassette obstructs extensive reduction of the size of the cassette. The base plate 1 is fixed along its end 1a to a stationary stand 8 with adhesive. This requires much care and accordingly, lowers the efficiency of fabrication, making it difficult to mass-produce videotape cassettes.

SUMMARY OF THE INVENTION

The object of this invention is to provide a pad which can be readily provided in the interior of a small-sized cassette, thus improving the efficiency of fabrication of small-sized cassettes.

To attain this object a pad according to this invention comprises a hollow cylinder of a resilient or flexible material having a tape-contacting part which is formed so as to be of good wearability and offering reduced friction. Opposing studs for retaining the hollow cylinder pad are provided in one half of a videotape cassette in such a position that these studs align with the tape-guiding surface of a guide stud. The wall of the hollow cylinder pad is fitted between these opposing studs simply by pushing the cylinder down therebetween.

A tape-contacting part of the hollow cylinder pad may be formed by applying with an adhesive, a patch of a material of good wearability and reduced friction onto the surface of the hollow cylinder pad.

The arrangement as described requires a minimum space to mount a pad, and mounting the pad in the interior of a videotape cassette requires only a push to the hollow cylinder pad to insert it into the space between the opposing studs. Accordingly, the fabrication of videotape cassettes which use this arrangement is inexpensive, and the size of the videotape cassette can be substantially reduced.

DESCRIPTION OF THE PREFERRED EMBODIMENTS

Figure 3A:
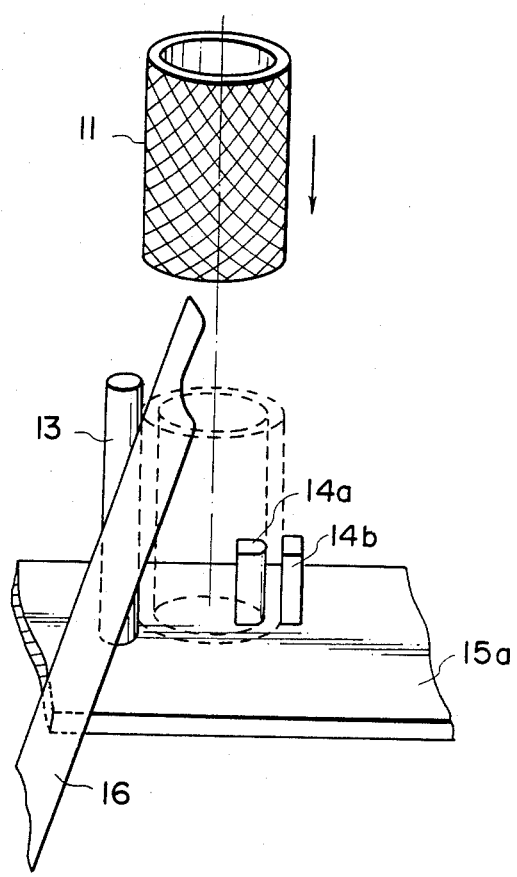
FIG. 3A is a perspective view showing the way how a pad in accordance with an embodiment of this invention is mounted on a videotape cassette.
Figure 3B:
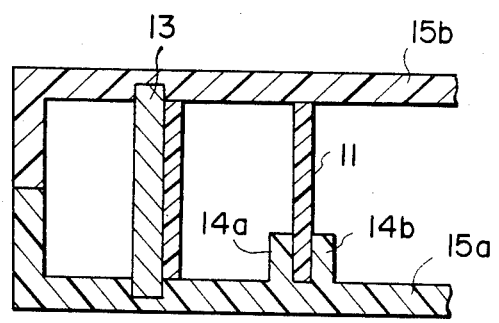
FIG. 3B is a partial sectional view of the videotape cassette provided with the pad as shown in FIG. 3A in accordance with an embodiment of this invention.

FIGS. 3A and 3B show a pad provided in the interior of a videotape cassette according to this invention. As seen in these drawings, a pad 11 consists of a resilient hollow cylinder. The pad 11 is made of a resilient material with a view to pushing a videotape against a stationary guide surface with an appropriate level of resilient force and is also made of sufficient wearability and low friction so that the pushing is in a substantially frictionless condition. In length the hollow cylinder pad is as great as the width of a videotape, and its diameter is determined in terms of the kind and thickness of the material used so as to cause a desired level of resilient force to be applied to a videotape 16 when the pad 11 is fitted in between opposing mount studs 14a and 14b. A guide stud 13 is integrally provided in the inside 15a of a cassette half, and likewise, mount studs 14a and 14b are integrally provided to the inside of the cassette half in the vicinity of the guide stud 13. Specifically, the guide stud and the mount studs are so positioned relative to each other that the hollow cylinder pad 11 when fitted in between the guide stud 13 and the opposing studs 14a and 14b, is yieldingly and radially deformed at the tape-contacting part of the pad. When the hollow cylinder pad 11 is mounted, the tape-contacting area of the pad is diametrically opposite to the fixing part of the pad. For the purpose of positively fixing the hollow cylindrical pad in the interior of a videotape cassette the longitudinal size of the cylinder may extend to the full distance from the floor 15a to the ceiling 15b of the interior of the cassette. In FIGS. 3A and 3B the mount studs 14a and 14b are shown as uprights of sufficient height to retain and hold the hollow cylinder pad 11. These studs, however, may extend to the ceiling of the cassette, thereby causing the cylindrical pad to yieldingly and evenly deform across its longitudinal side in contacting the videotape, and accordingly producing a resilient force evenly distributed across the full width of the videotape.

Figure 4:
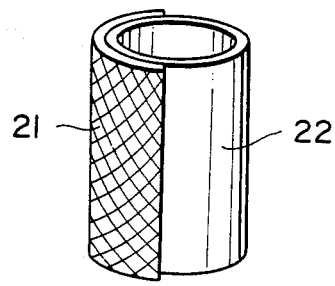
FIG. 4 is a perspective view showing a pad in accordance with another embodiment of this invention.

FIG. 4 shows a pad according to a second embodiment of this invention. This pad can be mounted in the interior of a videotape cassette in the same way as in the first embodiment mentioned above, and therefore, for the sake of simplicity a drawing showing the manner in which the pad of the second embodiment is retained in the interior of a videotape cassette is omitted.

As seen in FIG. 4, a semi-cylindrical patch 21 of a material of good wearability and low friction is applied to a resilient hollow cylindrical body 22 at a side at which the hollow cylinder will contact a videotape.

Generally, a material of good wearability and low friction is relatively expensive, and therefore, for the sake of reducing the cost of fabrication the material is reduced to the minimum possible size. The patch material used need not be resilient because the cylindrical body has sufficient resiliency.

Figure 1:
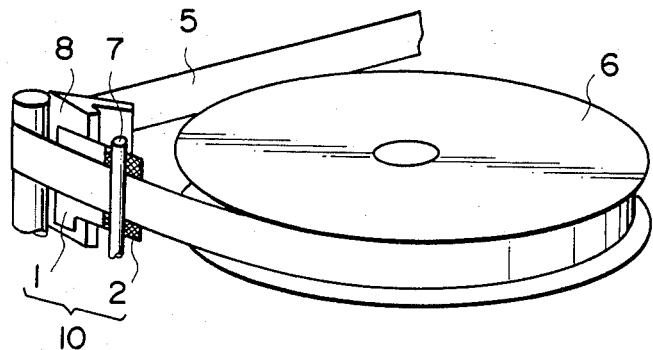
FIG. 1 is a perspective view of a part of a videotape cassette equipped with a conventional pad.
Figure 2A:
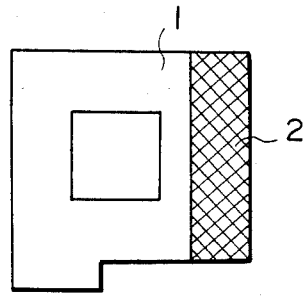
FIG. 2A is a front view of the conventional pad as shown in FIG. 1.
Figure 2B:
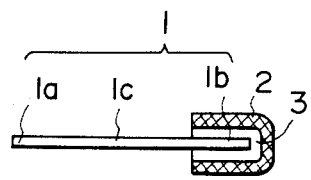
FIG. 2B is a plan view of the conventional pad shown in FIG. 2A.
Figure 5:
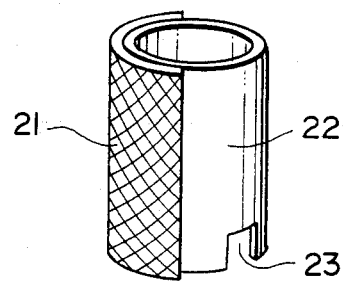
FIG. 5 is a perspective view showing a pad in accordance with still another embodiment of this invention.

FIG. 5 shows a pad according to a third embodiment of this invention. Similarly to the pad according to the second embodiment, the pad of FIG. 5 consists of a resilient hollow cylindrical body 22 and a patch 21 of good wearability and low friction which is applied to a side, of the cylindrical body 22. The pad of FIG. 5 is different from the one of FIG. 4 only in that in the pad of FIG. 5 a hollow cylindrical body 22 has a notched recess 23 in the lower periphery of the cylinder, thereby assuring that the hollow cylindrical pad is correctly mounted so that the patch side faces the guide surface of a guide stud. The pad of FIG. 5 can be fabricated at as small a cost as the pad of FIG. 4, less expensively than the one of FIG. 1, and while the patch material must be of good wearability and low friction, it need not be resilient.

As is apparent from the above, a pad provided in the interior of a videotape cassette requires only a small space to mount owing to its cylindrical shape. The pad can be readily mounted in the interior of the cassette simply by pushing down the hollow cylinder to insert the cylinder wall between the two opposing mount studs, and accordingly the efficiency of the fabrication work is improved, and the cost of fabrication is reduced.

We claim:

1. A videotape cassette comprising two halves, one of which is equipped with an upright guide stud and two opposing upright mount studs, and a hollow cylindrical pad of a resilient or flexible material, said pad being fitted in between the guide stud and the mount studs with the lower wall of the hollow cylinder inserted in between and retained by the opposing mount studs, the pad being adapted to yieldingly deform and resiliently push a videotape against the guide stud.

2. A videotape cassette according to claim 1 wherein said pad has a portion of low friction and good wearability over at least part of the cylindrical surface of the pad which is adapted to push contact a videotape.

3. A videotape cassette according to claim 1 wherein said hollow cylindrical pad has a notched recess on the lower perimeter of the cylinder.

4. A videotape cassette according to claim 2 wherein said portion of low friction and good wearability consists of a semicylindrical patch of the requisite physical characteristics affixed to the cylindrical body.

5. A videotape cassette according to claim 1 wherein said upright mount studs extend from the inner surface of one half to the inner surface of the other half of the videotape cassette when integrated into a single housing.

6. A videotape cassette according to claim 1 wherein said guide stud is diametrically opposite to said mount studs across the cylinder.

\* \* \* \* \*